US009013629B2

(12) United States Patent
Vito (10) Patent No.: US 9,013,629 B2
(45) Date of Patent: Apr. 21, 2015

(54) COLLAPSIBLE PROMPTING APPARATUS (71) Applicant: Promptbox International LLC, San Rafael, CA (US)

(72) Inventor: Linda Vito, San Rafael, CA (US)

( * ) Notice: Subject to any disclaimer, the term of this patent is extended or adjusted under 35 U.S.C. 154(b) by 0 days.

(21) Appl. No.: 14/145,630

(22) Filed: Dec. 31, 2013

(65) Prior Publication Data
US 2015/0009402 A1  Jan. 8, 2015

Related U.S. Application Data (63) Continuation-in-part of application No. 13/934,231, filed on Jul. 3, 2013.

(51) Int. Cl.
*H04N 5/225* (2006.01)
*H04N 5/222* (2006.01)

(52) U.S. Cl.
CPC ........... *H04N 5/2222* (2013.01); *H04N 5/2251* (2013.01); *H04N 5/2252* (2013.01)

(58) Field of Classification Search
CPC ... H04N 5/2251; H04N 5/222; H04N 5/2252; H04N 9/646
USPC ............. 348/375, 722, 373, 61, 14.01, 14.06, 348/14.08; 353/119, 122, 103, 113; 715/202; 396/1
See application file for complete search history.

(56) References Cited

U.S. PATENT DOCUMENTS

| 5,721,586 | A  | * | 2/1998 | Shimamura et al. | 348/61 |
|---|---|---|---|---|---|
| 6,980,253 | B1 | * | 12/2005 | Matsui | 348/375 |
| 2009/0256970 | A1 | * | 10/2009 | Bilbrey et al. | 348/722 |
| 2014/0247497 | A1 | * | 9/2014 | Giraldo | 359/601 |

* cited by examiner

*Primary Examiner* — Nhan T Tran
*Assistant Examiner* — Chan Nguyen
(74) *Attorney, Agent, or Firm* — Dahyee Law Group; Leon E. Jew (57) ABSTRACT

The invention provides a prompting apparatus comprising a collapsible prompting box and a mounting and adjusting assembly. The prompting box includes two symmetrical opposite walls, a bottom frame, a bottom, a top frame and a cover, which jointly define a space for housing a two-way see-though mirror and the lens of the camera. The two symmetrical opposite walls can be folded inwardly when the mirror can be folded up to the top frame. The cover defines a space for a user to slide in a tablet device which runs a prompting software application. The pre-designed text is displayed on the tablet device's screen at a speed that the speaker feels comfortable to read. The mounting and adjusting assembly couples the prompting box with the camera. When the apparatus is not in use, the prompting box can be easily folded for carrying convenience.

6 Claims, 15 Drawing Sheets

COLLAPSIBLE PROMPTING APPARATUS

CROSS REFERENCE TO RELATED APPLICATION

This application is a continuation-in-part of, and claims the benefit of priority to, the U.S. patent application Ser. No. 13/934,231 entitled "PROMPTING APPARATUS" filed on Jul. 3, 2013, the content of which is incorporated in its entirety by reference herein.

FIELD OF THE INVENTION

This invention generally relates to an autocue displaying device that prompts a person speaking with an electronic visual text of a speech or script. In particular, this invention relates to a prompting apparatus including a collapsible box which allows a user to use a tablet device as the apparatus' display, and a mounting assembly which allows the user to couple the box with a video camera or a camcorder by steps which are as simple as loosening and fastening few fasteners.

BACKGROUND OF THE INVENTION

A teleprompter is an assembly which enables on-camera talent to look directly into the lens of the camera and read a prepared script text that is generated by a computer software application that allows scrolling up of the text so the reader can keep up with the up-coming text as she reads aloud. The reader sees the text reflected from a two-way mirror and the audience can only sees the scene being shot by the camera through the two-way mirror.

Such type of prompters evolved from the days of cathode ray TV tube displays. As a result, they were heavy off-camera devices that had to be mounted below the front of the camera on a "sled" between the camera and the camera pan and tilt head, which is then mounted on a tripod. Typically these prompters were heavy and time-consuming to mount and operate. Usually it takes a professional about 30 minutes to set-up, align, balance and trim and connect to a personal computer.

With the availability of small size, low-cost and light-weight LCD displays and tablet devices, it is now possible to design and build a prompter that is lightweight, mounts in a more industry standard manner and is very quick to mount, set-up and use.

It is an object of the present invention to provide a simple, lightweight, compact yet effective prompting apparatus that enables a speaker to look directing into a camera's lens which is hidden behind a prompting mirror and invisible to the speaker, and at the same time read the textual or other information shown on the prompting mirror, and that can be easily coupled with a video camera or a camcorder which has an accessory adapter shoe on its top.

It is a further object of the present invention to provide a prompting apparatus with a shrouded chamber immediately behind an inclined prompting mirror and the camera's lens is positioned in the chamber and behind the mirror such that unwanted light is blocked from entering the camera's lens and the best quality of the recorded images by the camera can be reached.

It is a still further object of the present invention to provide a prompting apparatus using a tablet device facing down to the prompting mirror, which is positioned at a 45 degree angle to the display screen of the tablet device, such that unwanted light from the light sources above the apparatus can be blocked from directly shining on the display screen.

It is an additional object of the present invention to provide a prompting apparatus with a collapsible housing, which can be conveniently pop-up for use and can be conveniently folded into a package when not in use. When the housing is popped-up, the tablet can be conveniently positioned as a ceiling facing down to the prompting mirror, which is positioned at a 45 degree angle to the tablet device's display screen, such that the interference on the display screen and the prompting mirror caused by unwanted light is minimized and the clarity of the images on the prompting mirror viewed by the speaker is maximized.

It is yet another object of the present invention to provide a mounting and adjustment assembly which enables a user to couple the prompting apparatus to a video camera or a camcorder which has an accessory adapter shoe on its top.

SUMMARY OF THE INVENTION

The prompting apparatus according to the present invention includes a prompting box and a universal mounting assembly to allow adjustment and mounting to most medium sized camcorders or video cameras.

The prompter box includes a see-through mirror and a housing which includes a member for holding a tablet device facing down to the mirror. The prompting box has an open front, two opposite shrouding walls, a shrouding bottom, and a rear shrouding wall. The see-through mirror, which is approximately 40~60% reflective and 30~40% transparent, is held in position at a 45 degree angle to the screen surface of the tablet device. The rear shrouding wall has a round opening, or called through-hole, for placing the camera's lens. The see-though mirror is adjustable. When it is pushed up to be paralleled to the top cover, the two opposite shrouding walls are collapsed so that the box can be folded horizontally.

The mounting assembly includes a vertical adjustment column, an elongate adjustment arm, two thumb screws for coupling the elongate adjustment arm with the vertical adjustment column, one thumb screw for coupling the vertical adjustment column with the top of the box, and an upright mounting bracket which is sub-assembly including two thumb screws and an upright shaft or bracket with a rectangular or square flat base which is for coupling with an accessory adapter shoe on the camera's top. The vertical adjustment column is secured to the top of the housing by one or two thumb screws against a stud which can be coupled with the top of the box. The elongate adjustment arm has a slot along its length direction.

In a typical configuration, the elongate adjustment arm is secured to the vertical adjustment column by two thumb screws which are perpendicular to each other. The vertical adjustment column is secured to the box through the thumb screws and the stud inserted in a slot on the top of the box. The camera is secured to the elongate adjustment arm through the thumb screws and the upright bracket. The bracket's upper portion is inserted into the slot on the elongate adjustment arm and moved horizontally in the slot until its flat base is aligned with the video camera's accessory adapter shoe. The thumb screws are then fastened to secure the camera to the elongate adjustment arm.

DETAILED DESCRIPTION OF THE INVENTION

While the present invention may be embodied in many different shapes, forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principle, the essence or the spirit of the invention as described herein are contemplated as would normally occur to one skilled in the art to which the invention relates.

The apparatus according to this invention includes a collapsible prompter unit and a mounting and adjusting assembly for coupling the prompter unit to a video camera or a camcorder, herein after referred to as a camera, which has an accessory adapter shoe, usually called accessory shoe, on its top. The prompter unit, also called prompting box, includes an inclined two-way mirror which is placed in the inner space of the box, and a tablet device which is placed inside the space defined by the top of the box with its display screen facing toward the mirror. The tablet device's display screen is preferably at 45 degree angle to the mirror. The optical image on the tablet device's display screen is shown on the two-way see-through mirror and then reflected to the eyes of a speaker who looks into the mirror. The lens of the camera is placed in the back of the mirror. Because of reflection, only the images from the speaker's direction may enter the lens.

The present invention discloses and teaches a prompting apparatus for coupling with a camera for video recording which has an accessory adapter shoe on its top. The apparatus includes (1) a rectangular housing with an open front defined by two symmetrical opposite side walls, a bottom frame, a flat bottom, a top frame, and a flexible rear wall with a round opening for positioning and aligning the camera's lens; (2) a flat see-through mirror being placed in the housing with its upper edge being operably coupled to the top frame's rear edge, its lower edge being placed against the flat bottom such that the see-through mirror and the side walls as well as the real wall forming a chamber where the lens is positioned and aligned behind the see-through mirror; (3) a cover operably coupled to the top frame, the cover and the top frame defining a space for holding a tablet device with its screen facing down at an angle of approximately 45 degrees from the see-through mirror and in operation, image on the screen is reflected by the see-through mirror to a speaker's eyes seeing into the see-through mirror while light from the speaker passes through the see-through mirror into the lens; and (4) a mounting and adjusting hardware assembly for coupling the housing with the camera through the accessory adapter shoe. Each of the two symmetrical opposite side walls includes an upper portion and a lower portion being operably coupled with each other through a first hinging means, the upper portion being operably coupled with the top frame through a second hinging means, and the lower portion being operably coupled with the bottom frame through a third hinging means. When the see-through mirror is folded up to the top frame, the two symmetrical opposite side walls can be folded inwardly such that the top frame and bottom frame be occluded. The hardware assembly includes a vertical adjustment column which is secured to the cover's top, an elongate adjustment arm being operably coupled with the vertical adjustment column to a necessary vertical height and held in place by a fastening means, and an upright bracket with its bottom end being operatively coupled and secured to the accessory adapter shoe and with its top end being operatively coupled with the elongate adjustment arm for adjusting a horizontal distance from the shaft to the upright bracket. The details of the invention are illustrated below.

Figure 1:
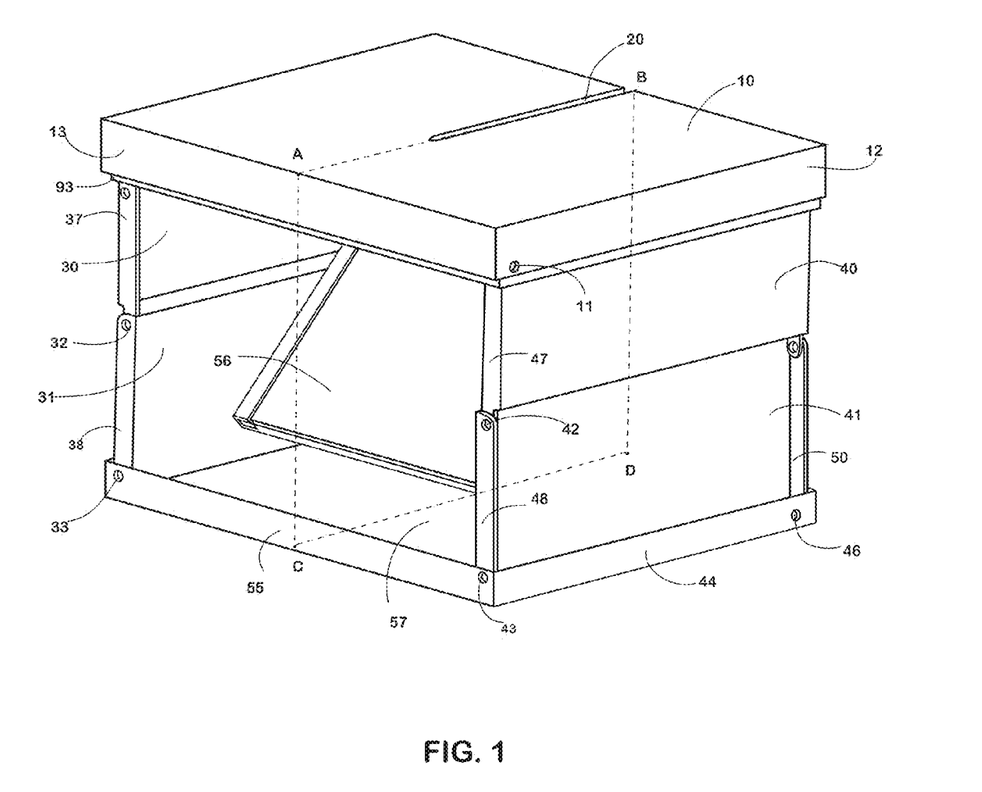
FIG. 1 is a schematic diagram illustrating a perspective view of a typical embodiment of the prompting apparatus according to the present invention.
Figure 1A:
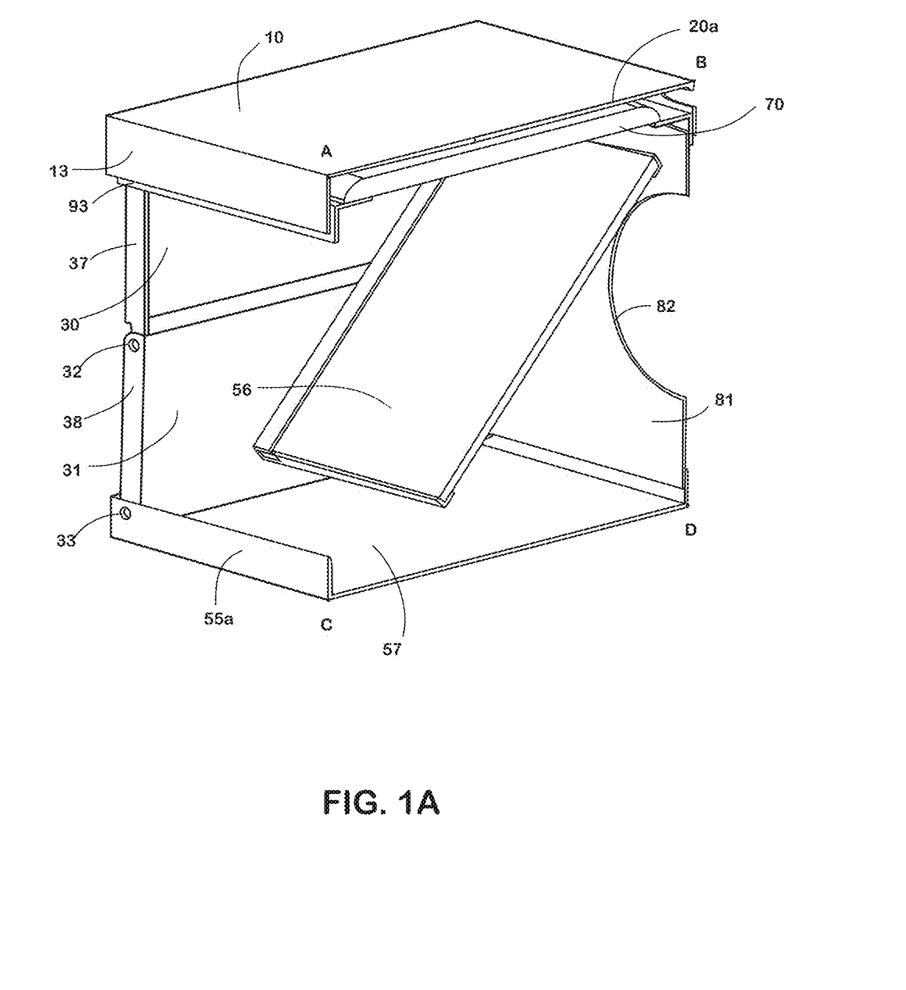
FIG. 1A is a schematic diagram illustrating the perspective view along the cross-section of ABDC on FIG. 1, which shows the internal structure of FIG. 1.
Figure 1B:
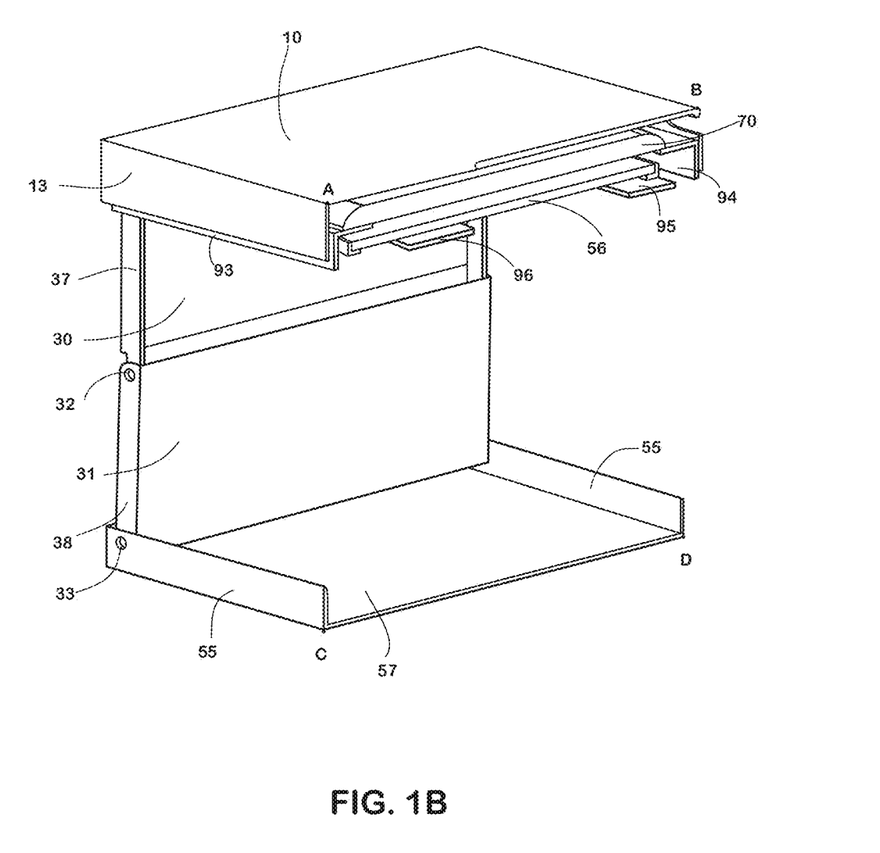
FIG. 1B is a schematic diagram illustrating the perspective view along the cross-section of ABDC on FIG. 1, which shows the internal structure of FIG. 1 after the see-through mirror is removed.
Figure 2:
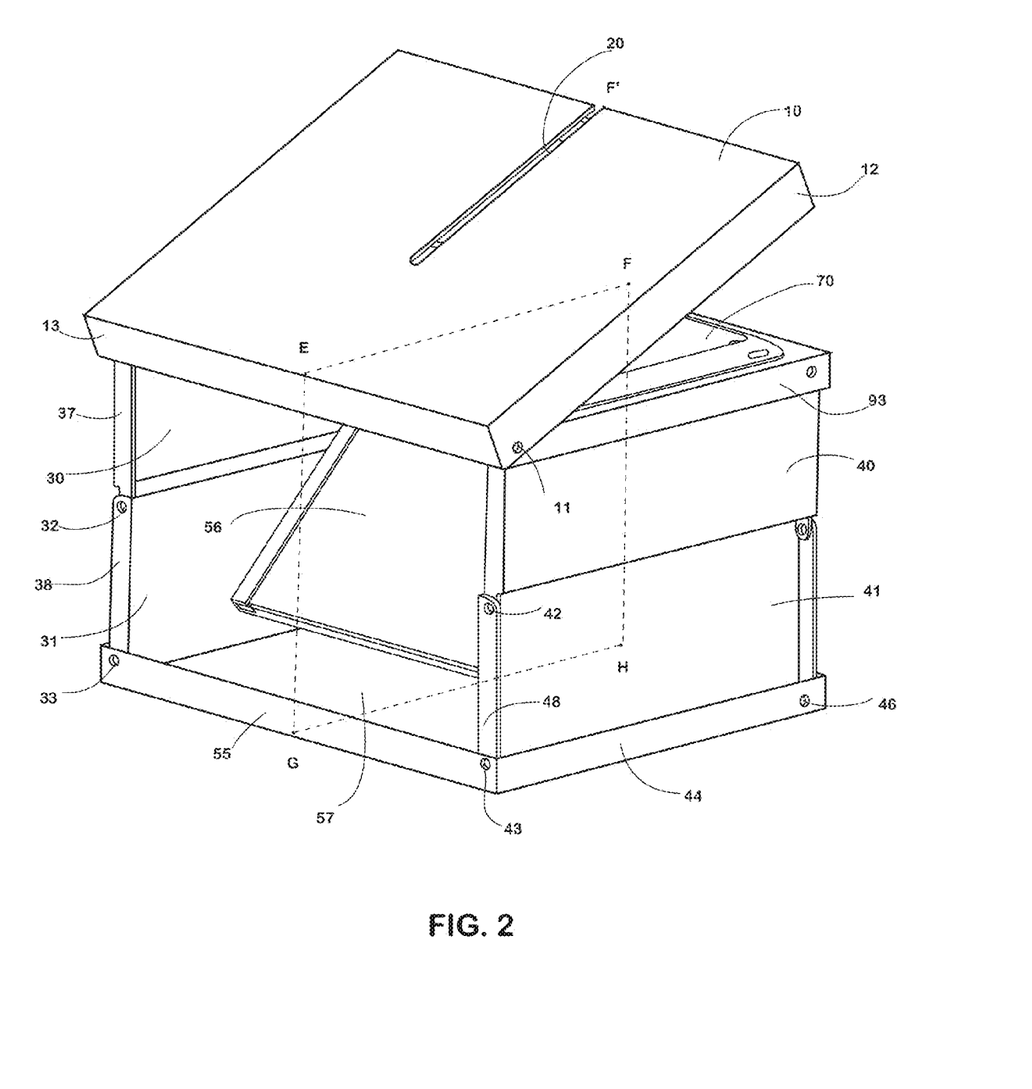
FIG. 2 is a schematic diagram illustrating a perspective view of the prompting apparatus according to FIG. 1 after the cap is partially opened.
Figure 2A:
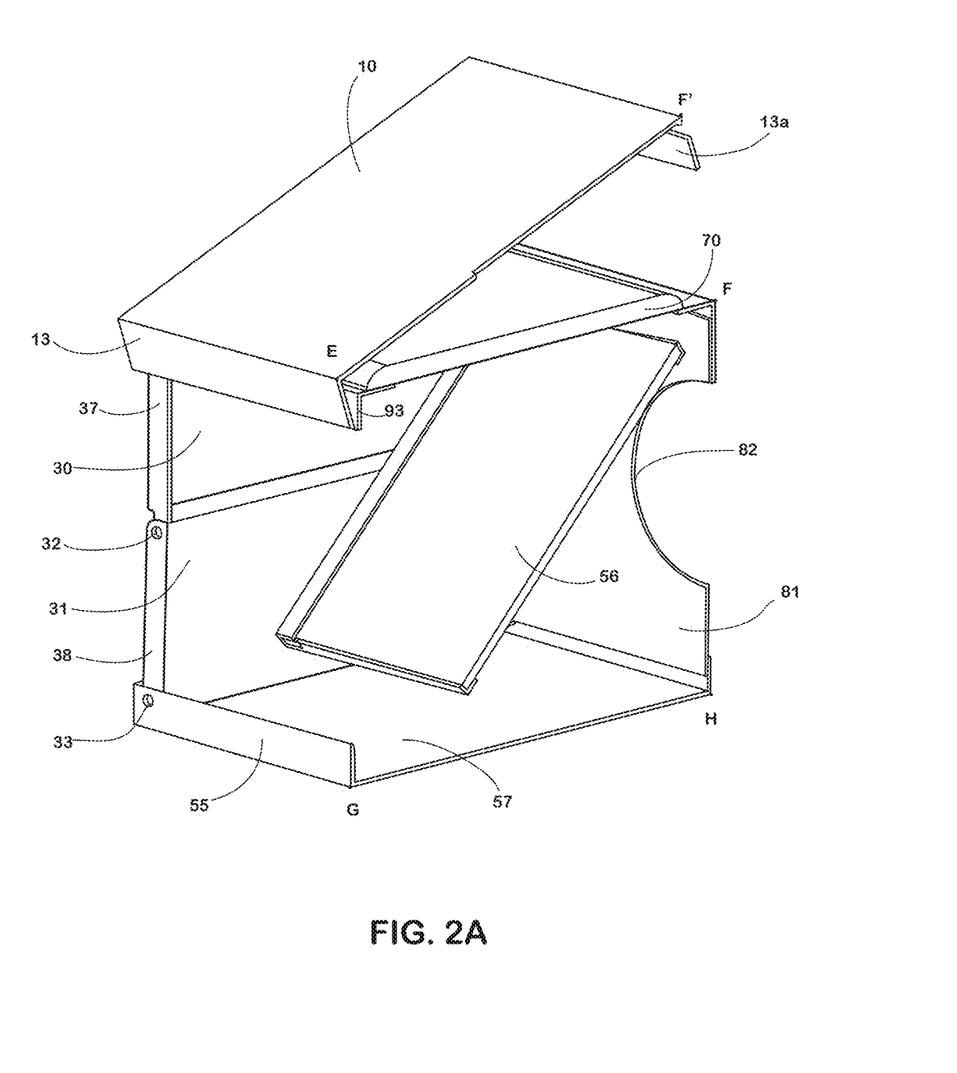
FIG. 2A is a schematic diagram illustrating the perspective view along the cross-section of EFHG on FIG. 2, which shows the internal structure of FIG. 2.

FIG. 1 illustrates a perspective view of a typical preferred embodiment of the prompting apparatus according to the present invention. FIG. 1A illustrates the perspective view along the cross-section of ABDC on FIG. 1, which shows the internal structure of FIG. 1. FIG. 1B illustrates the perspective view along the cross-section of ABDC on FIG. 1, which shows the internal structure of FIG. 1 after the see-through mirror is removed. Refer to FIG. 1A and FIG. 1B, the tablet device 70 is placed inside of the top cover, i.e., the space defined by the box cover 10. The box includes a cover 10, a bottom 57, two symmetrical side walls each of which including two portions coupled together via a hinging means such as the sockets 32 and 42, and an inclined two-way see-through mirror 56 which is placed inside the space defined by the symmetrical side walls, the bottom 57, the bottom frame defined by four sides such as the members 55 and 44 shown in FIG. 1 and FIG. 1B, and the top frame under the cover 10. Substantially similar to the bottom frame, the top frame is defined by four sides such as the members 93 and 94 shown in FIG. 1B. The lower portions of the side walls are coupled to the bottom frame's corresponding sides 44 and 55 via hinging means such as the sockets 33, 43. The upper portions of the side walls are coupled to the top frame via hinging means substantially similar to the sockets 33 and 43.

The inclined two-way mirror 56 is a see-through mirror with an optical grade of approximately 60~70% reflective and approximately 30~40% transparent. It is held in position at a 45 degree angle to the display screen of the tablet 70 which is placed inside the space defined by the top frame, bottom frame and two symmetrical side walls. The mirror can be fold up to the top frame. The upper edge of the mirror is operably coupled to the rear end of the top frame through a hinging means (not shown in the drawings) substantially similar to the sockets 33 and 43, and the lower edge is placed against the flat bottom. When the mirror is folded up, it can be fixed by a clipper attached to the top frame. The reflective surface of the mirror 56 faces outward such that the speaker in front of the prompter box can read the textual image reflected from the tablet's display screen. The camera's lens is placed in the back of the mirror 56 through the round opening 82 but it is invisible to the speaker. Because the mirror is 30~40% transparent, the speaker's image can be caught by the lens and then recorded by the recording device attached to the camera. For the best recording quality, the lens' front surface is preferably at a 45 degree angle to the inclined mirror 56.

The box cover 10 includes four sides such as 12 and 13 in FIG. 1. It is coupled to the top frame via hinging means such as the socket 11. The box's cover's four sides are mechanically fitting to the top frame's four sides such that the cover can be opened and closed smoothly. The top frame and the box's cover define a space fitting for the tablet device 70. The box cover 10 also has a groove 20 on its top for coupling with the camera.

Figure 3:
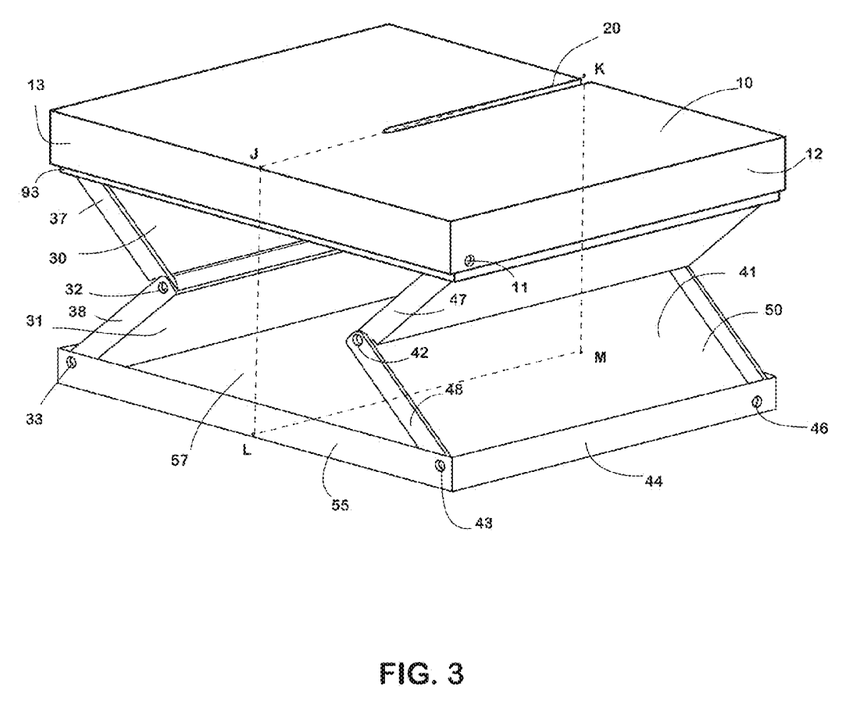
FIG. 3 is a schematic diagram illustrating a perspective view of the prompting apparatus according to FIG. 1 after the see-through mirror is folded up and the two opposite shrouding walls are to be folded inwardly.
Figure 3A:
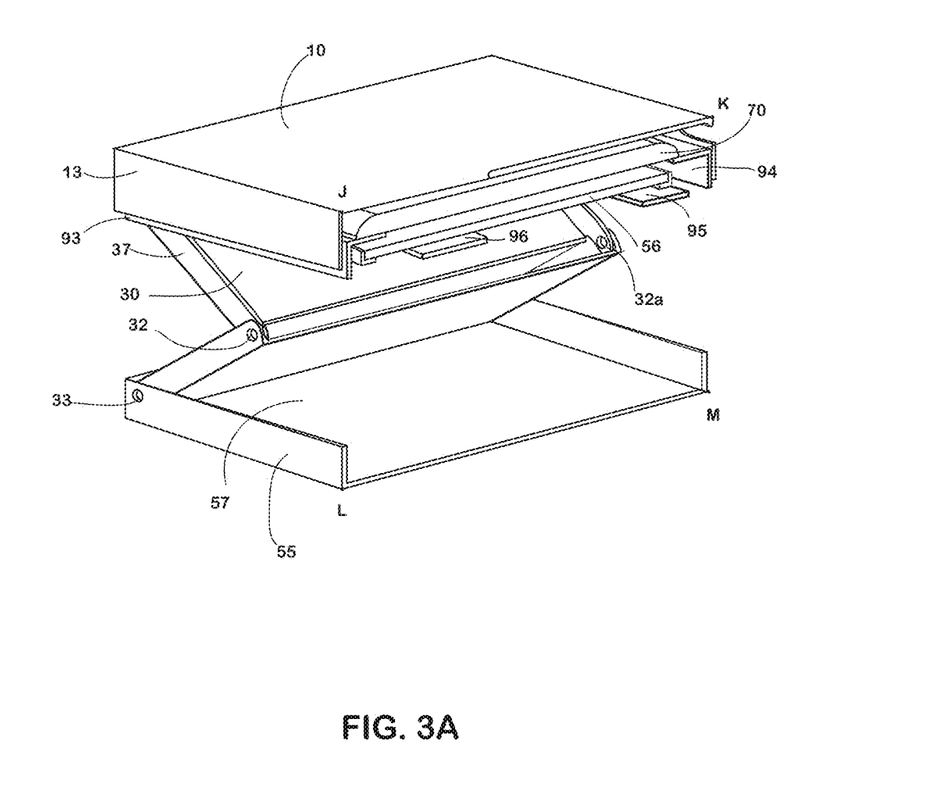
FIG. 3A is a schematic diagram illustrating the perspective view along the cross-section of JKML on FIG. 3, which shows the internal structure of FIG. 3.
Figure 4:
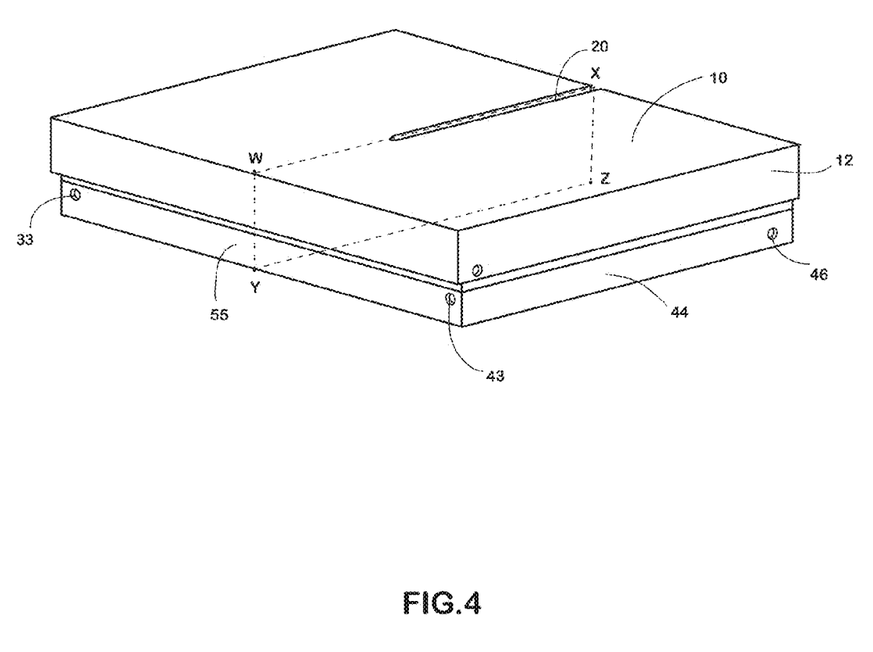
FIG. 4 is a schematic diagram illustrating a perspective view of the prompting box according to FIG. 1 when it is folded.
Figure 4A:
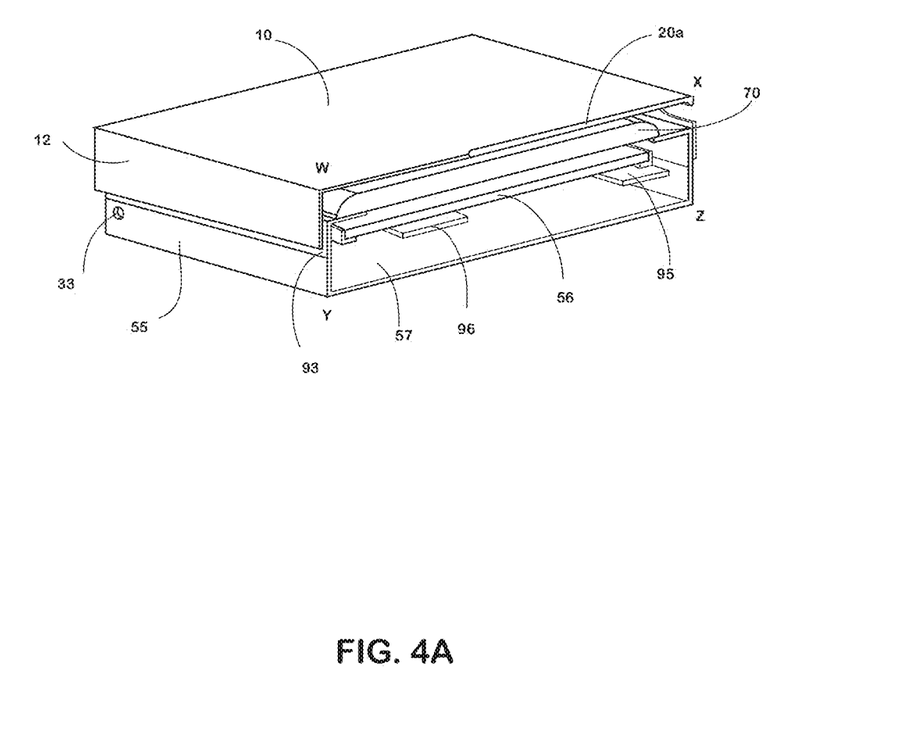
FIG. 4A is a schematic diagram illustrating a perspective view along the cross-section of WXZY on FIG. 4, which shows the internal structure of FIG. 4.

FIG. 3 illustrates a perspective view of the prompting apparatus according to FIG. 1 after the see-through mirror is folded up and the two opposite shrouding walls are to be folded inwardly. FIG. 3A illustrates the perspective view along the cross-section of JKML on FIG. 3, which shows the internal structure of FIG. 3. The inclined mirror 56 is in a square or a rectangular shape with a width which is substantially identical to the inner distance between the two opposite side walls. The mirror 56 is flexibly placed and can be folded up to the top frame. When the mirror 56 is folded up, it can be then locked or fixed by a means such as two supporting members 95 and 96 shown in FIG. 1B and FIG. 3A, and the two opposite symmetrical walls can be folded inwardly. For example, as shown in FIG. 3A, the left side wall is folded inwardly via a hinging means such as the sockets 32 and 32a. The lower portion 31 is folded down to the bottom 57 via a hinging means such as the sockets 33 and 33a (not shown in FIG. 3), the upper portion 30 is folded up to the top frame via hinging means (not shown in FIG. 3) similar to the member 33, and the top frame and the bottom frame are occluded as shown in FIG. 4 which illustrates a perspective view of the prompting box according to FIG. 1 when it is folded, and FIG. 4A which illustrates a perspective view along the cross-section of WXZY on FIG. 4, which shows the internal structure of FIG. 4.

The inclined mirror 56, the two opposite symmetrical walls (30/31, 40/41), the rear wall 81, and the display screen of the tablet device 70 which is placed within the cover 10, constitute an inner chamber wherein the camera's lens resides. To block unwanted lights into the chamber, a flexible elastic collar or sleeve can be operatively attached around the round opening 114 as show in FIG. 5A. After the lens is inserted into the inner chamber through the opening 82 in FIG. 1A (or 114 in FIG. 5A and FIG. 5E), the sleeve is internally attached to or locked on the camera, such that unwanted lights cannot enter the chamber from the gap between the round opening and the camera.

Figure 5A:
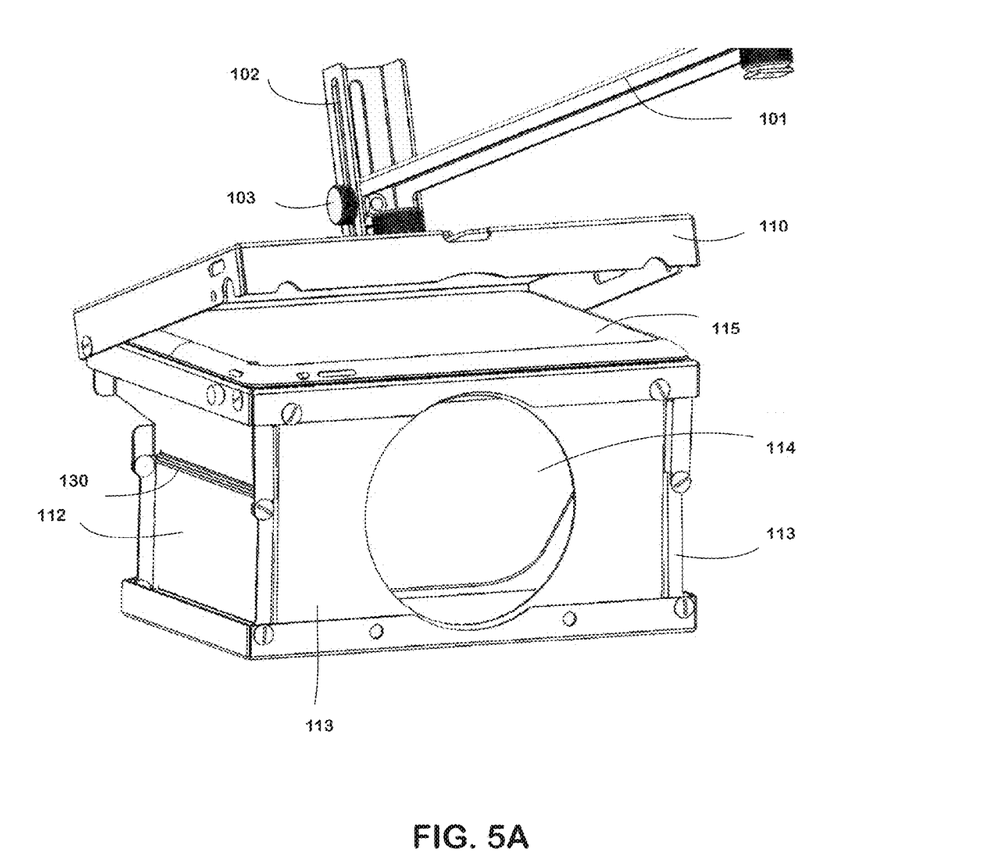
FIG. 5A is a schematic diagram illustrating a back perspective view of a typical embodiment of the prompting box according to FIG. 1 which is coupled to a mounting and adjusting assembly.
Figure 5B:
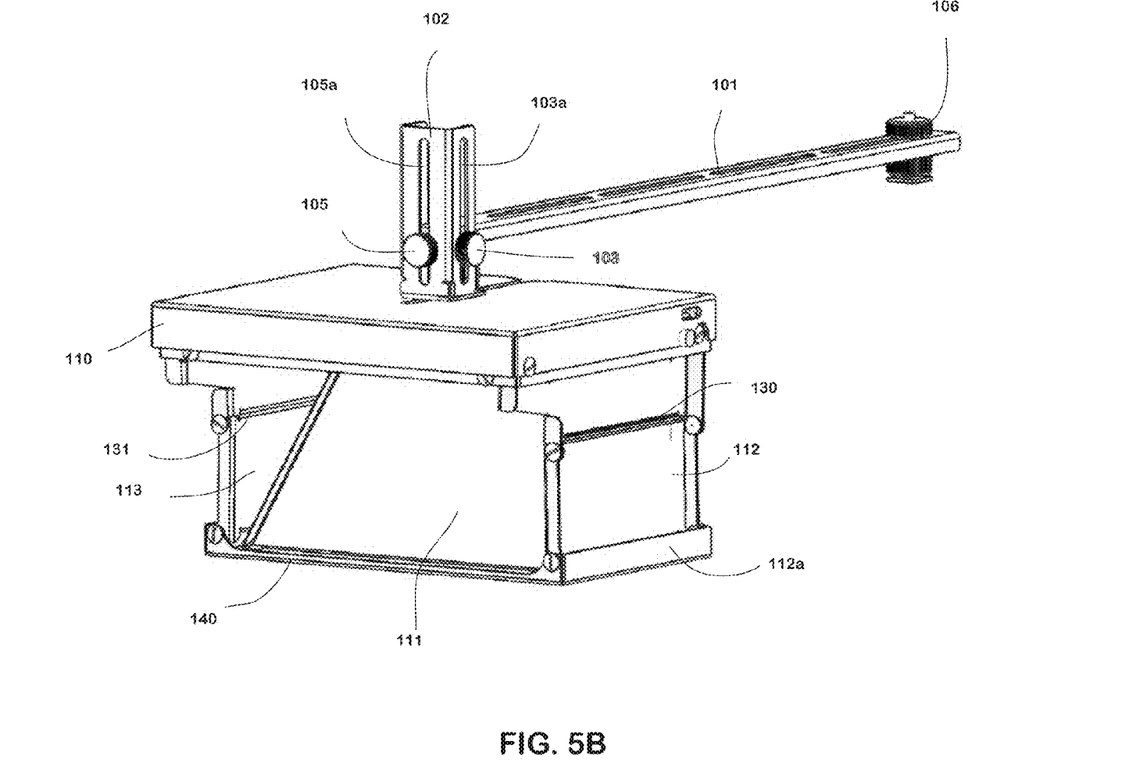
FIG. 5B is a schematic diagram illustrating a front perspective view of the prompting box according to FIG. 5A.
Figure 5C:
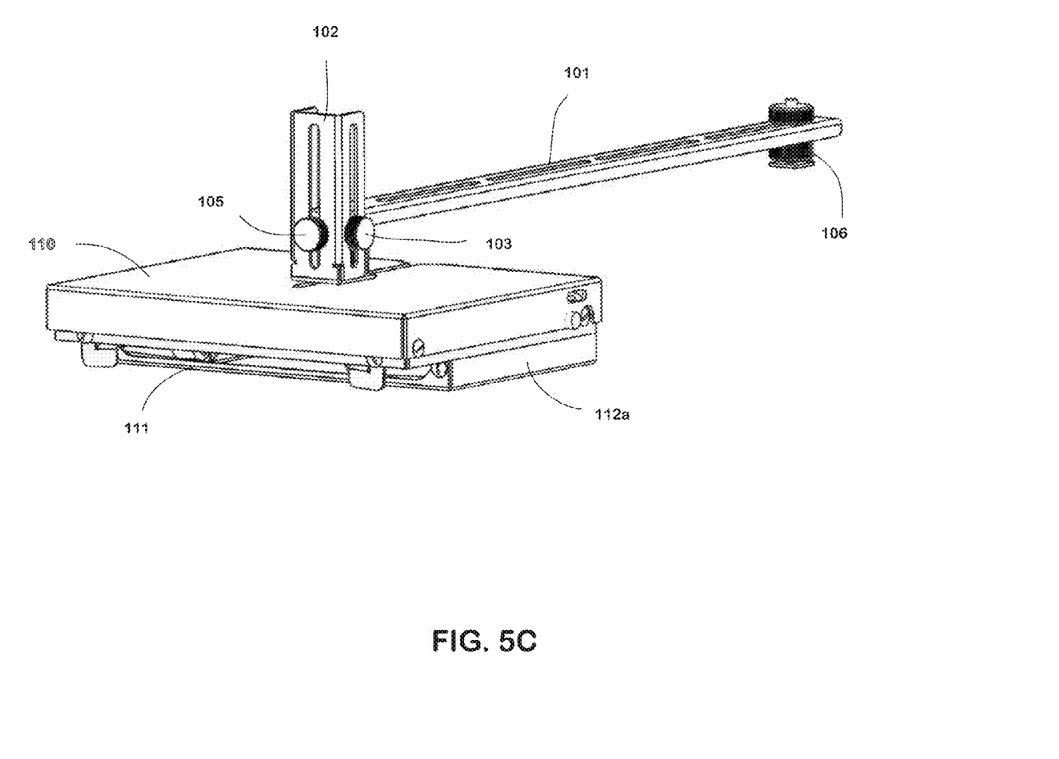
FIG. 5C is a schematic diagram illustrating a front perspective view of prompting box according to FIG. 5A when it is folded.
Figure 5D:
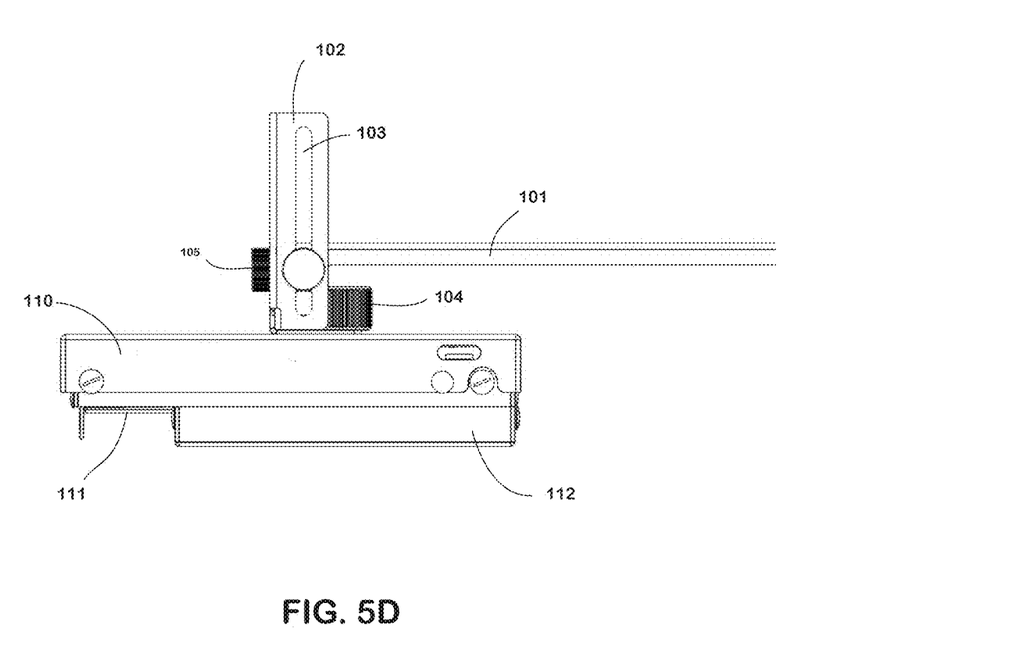
FIG. 5D is a schematic diagram illustrating a side view of the prompting box according to FIG. 5A when it is folded.
Figure 5E:
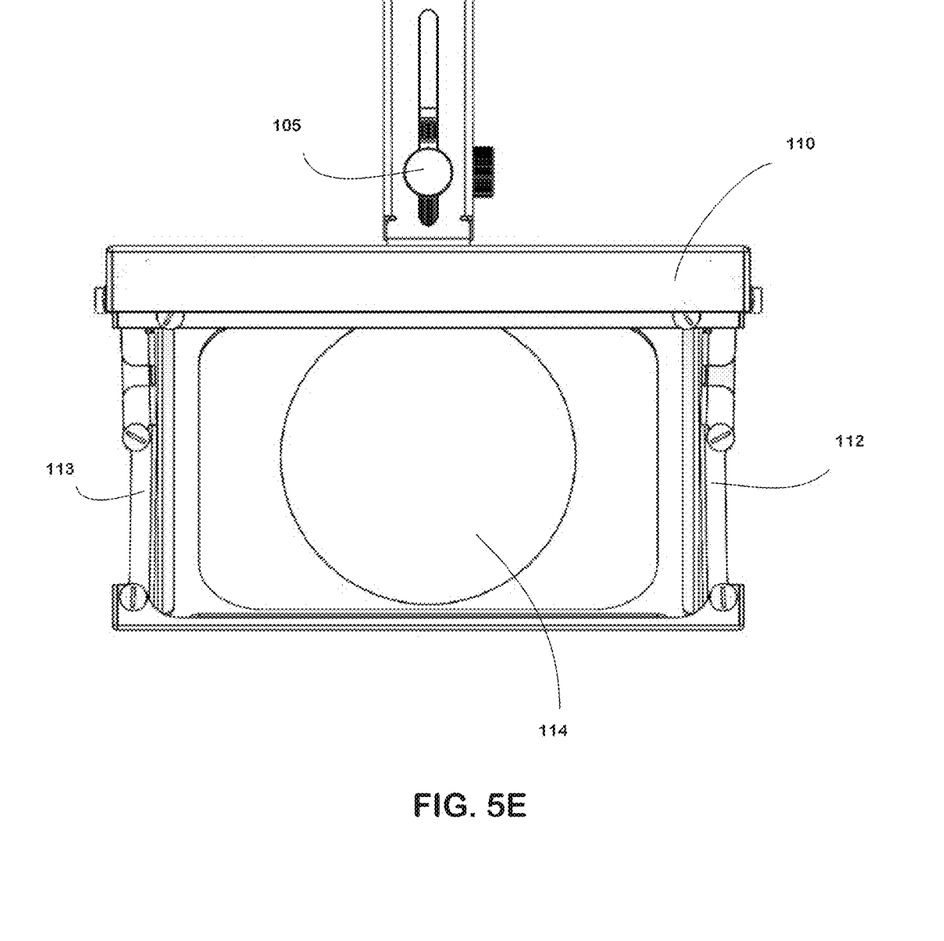
FIG. 5E is a schematic diagram illustrating a front side view of the prompting box according to FIG. 5A when it is fully folded.
Figure 5F:
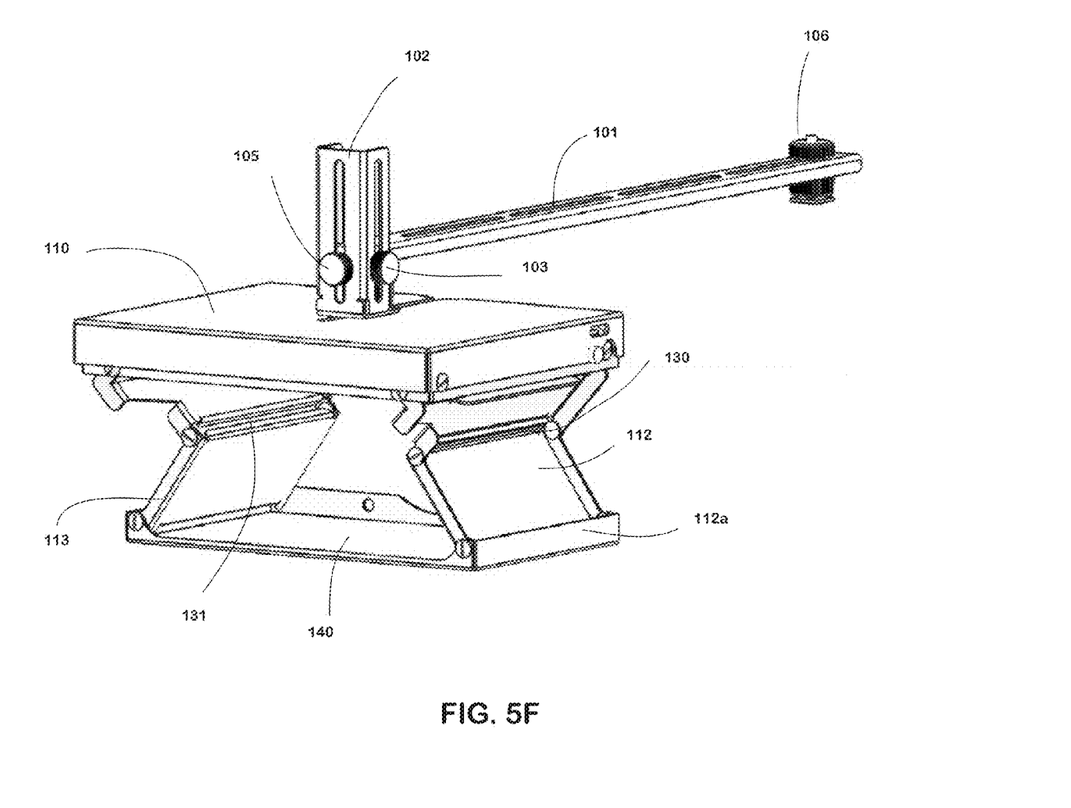
FIG. 5F is a schematic diagram illustrating a front perspective view of the prompting box according to FIG. 5A when the see-through mirror is folded up.

FIG. 5A illustrates a back perspective view of a typical embodiment of the prompting box according to FIG. 1 which is coupled to a mounting and adjusting assembly. FIG. 5B illustrates a front perspective view of the prompting box according to FIG. 5A. FIG. 5C illustrates a front perspective view of prompting box according to FIG. 5A when it is folded. FIG. 5D illustrates a side view of the prompting box according to FIG. 5A when it is folded. FIG. 5E illustrates a front side view of the prompting box according to FIG. 5A when it is fully folded. FIG. 5F illustrates a front perspective view of the prompting box according to FIG. 5A when the see-through mirror is folded up.

The box cover illustrated in FIG. 1 through FIG. 4 is mechanically coupled to a mounting and adjusting assembly of hardware as shown in FIG. 5A through FIG. 5F. The hardware assembly includes: (1) a vertical adjustment column 102 which is secured to the box cover by a securing means such as by a thumb screw 104 and double-mount stud (not shown in FIG. 5A through FIG. 5F); (2) an elongate adjustment arm 101, which is vertically coupled to the vertical adjustment column 102 by a securing means such as by a first thumb screw 105 which can be adjusted vertically along the slot 105a in the column 102, and a second thumb screw 103 which can be adjusted vertically along the slot 103a in the column 102; and (3) a sub-assembly 106 for securing a camera to the elongate adjustment arm 101. The sub-assembly 106 includes a flat rectangular or square base and a pair of fasteners. The base and the corresponding fastener are used for coupling with a camera's accessory adapter shoe. The sub-assembly 106 can be slidably adjusted along a hollow slot in the elongate adjustment arm 101. In a typical configuration, the cross section of both the vertical column and the elongate arm is in "U" shape. The exterior width of the elongate arm 101 is slightly narrower than the interior width of the vertical column 102 such that the latter can be slid in the inner path of the former.

The hardware mounting and adjustment assembly described above can be further modified in several aspects without changing the spirit and scope of this invention.

In operation, the inverted textual image generated by a prompting software application is shown on the tablet device's display screen. Upon reflection, the speaker in front of the prompter can read the textual image in its normal format. The pre-designed prompting text or other information is displayed on the display screen at a speed that the speaker feels comfortable to read. The unit may have a wireless remote control function which enables the speaker to adjust the moving speed of the script or images on the mirror.

The prominent advantage of the present invention is that when apparatus is not in use, the prompting box can be easily folded into a smaller flat box for carrying convenience.

While one or more embodiments of the present invention have been illustrated above, the skilled artisan will appreciate that modifications and adoptions to those embodiments may be made without departing from the scope and spirit of the present invention.

What is claimed is:

1. A prompting apparatus for coupling with a camera for video recording which has an accessory adapter shoe on its top, comprising:
   a rectangular housing with an open front defined by two symmetrical opposite side walls, a bottom frame, a flat bottom, a top frame, and a flexible rear wall with a round opening for positioning and aligning said camera's lens;

a flat see-through mirror being placed in said housing with its upper edge being operably coupled to said top frame's rear edge, its lower edge being placed against said flat bottom such that said see-through mirror and said side walls and said rear wall forming a chamber where said lens is positioned and aligned behind said see-through mirror;

a cover operably coupled to said top frame, said cover and said top frame defining a space for holding a tablet device with its screen facing down at an angle of approximately 45 degrees from said see-through mirror and in operation, image on said screen is reflected by said see-through mirror to a speaker's eyes seeing into said see-through mirror while light from said speaker passes through said see-through mirror into said lens; and a mounting and adjusting hardware assembly for coupling said housing with said camera through said accessory adapter shoe;

wherein each of said two symmetrical opposite side walls comprising an upper portion and a lower portion being operably coupled with each other through a first hinging means, said upper portion being operably coupled with said top frame through a second hinging means, and said lower portion being operably coupled with said bottom frame through a third hinging means;

wherein when said see-through mirror is folded up to said top frame, said two symmetrical opposite side walls can be folded inwardly such that said top frame and bottom frame be occluded; and wherein said hardware assembly comprising a vertical adjustment column which is secured to said cover's top, an elongate adjustment arm being operably coupled with said vertical adjustment column to a necessary vertical height and held in place by a fastening means, and an upright bracket with its bottom end being operatively coupled and secured to said accessory adapter shoe and with its top end being operatively coupled with said elongate adjustment arm for adjusting a horizontal distance from said vertical adjustment column to said upright bracket.

2. The prompting apparatus of claim 1, wherein an elastic sleeve is coupled around and between said round opening and said camera to prevent unwanted lights from entering said chamber.

3. The prompting apparatus of claim 1, wherein inner surfaces of said two opposite side walls, said bottom side and said rear wall are coated with anti-reflection materials to prevent unwanted lights from reflecting into said mirror and said lens.

4. The prompting apparatus of claim 1, wherein said vertical adjustment column is secured to said cover's by at least one stud and one thumb screw.

5. The prompting apparatus of claim 1, wherein said fastening means comprises two slots on said vertical adjustment column, each for a thumb screw being operably secured to a female member on one end of said elongate adjustment arm.

6. The prompting apparatus of claim 1, wherein said elongate adjustment arm's exterior width is slightly narrower than said vertical adjustment column's interior width such that said elongate adjustment arm can be slid in an inner path of said vertical adjustment column.

* * * * *